US006843355B2

(12) United States Patent
Szadkowski et al.

(10) Patent No.: US 6,843,355 B2
(45) Date of Patent: Jan. 18, 2005

(54) CLUTCH LEVER LOCATOR

(75) Inventors: Andrzej Szadkowski, Southern Pines, NC (US); Ronald B. Morford, Southern Pines, NC (US); Muneer Abusamra, Southern Pines, NC (US)

(73) Assignee: ZF Sachs AG, Schweinfurt (DE)

(*) Notice: Subject to any disclaimer, the term of this patent is extended or adjusted under 35 U.S.C. 154(b) by 0 days.

(21) Appl. No.: 09/940,752

(22) Filed: Aug. 28, 2001

(65) Prior Publication Data

US 2003/0042106 A1 Mar. 6, 2003

(51) Int. Cl.[7] .......................... F16D 13/44; F16D 13/75

(52) U.S. Cl. .................. 192/99 A; 192/70.25; 192/70.3

(58) Field of Search ............................ 192/99 A, 70.29, 192/70.3, 70.25, 89.24, 89.26

(56) References Cited

U.S. PATENT DOCUMENTS 2,031,311 A * 2/1936 Harris ..................... 192/89.26
4,034,836 A * 7/1977 Sink et al. ............... 192/70.29
4,157,749 A * 6/1979 Sink et al. ................ 192/99 A
4,720,002 A * 1/1988 Kitano et al. ............ 192/111 B
5,566,804 A * 10/1996 Gochenour et al. ....... 192/111 A
5,593,015 A * 1/1997 Kosumi et al. .......... 192/70.27
6,394,254 B1 * 5/2002 Ijames ...................... 192/70.29

* cited by examiner

*Primary Examiner*—Rodney H. Bonck
(74) *Attorney, Agent, or Firm*—Cohen, Pontani, Lieberman & Pavane

(57) ABSTRACT

A clutch is provided that includes a sleeve having a retainer movable along a rotational axis. A clutch member, such as an adjusting ring, is movable along the rotational axis. The clutch member includes a perch spaced from the rotational axis protruding from a surface on the clutch member. The perch includes first and second opposing outer walls with the second outer wall extending from the surface on an angle toward the first outer wall. A lever including a portion having a slot is supported on the perch by the slot. The slot includes first and second opposing inner walls proximate to the first and second outer walls, respectively, with the first inner wall forming an apex with a first face of the lever adjacent to the surface. The apex defines a lever fulcrum about which the lever pivots. A connector secured to the clutch member with a portion of the second end portion arranged between the connector and the clutch member for retaining the second portion against the surface.

20 Claims, 2 Drawing Sheets

CLUTCH LEVER LOCATOR

BACKGROUND OF THE INVENTION

This invention relates to a clutch for a vehicle, and more particularly, the invention relates to a locator for retaining the levers within the clutch that are utilized to engage and disengage the clutch.

Manual clutches are utilized for many heavy duty vehicle applications. Actuation of a clutch pedal moves the clutch from an engaged position in which torque may be transmitted from an engine to a transmission to a disengaged position in which the gears of the transmission may be changed. The clutch pedal is connected to a sleeve and retainer in the clutch through a linkage. A plurality of levers, typically six, have ends that are supported in the retainer. An opposing end portion includes a fulcrum that is supported on a rotating clutch member, such as an adjusting ring. Movement of the sleeve and retainer through a clutch pedal moves the rotating clutch member to engage and disengage the clutch.

The end portion of the lever is typically supported on the clutch member by a slot in the lever which is supported on a protrusion or perch extending from a surface of the clutch member. During normal clutch operation, the lever may move axially relative to the rotating member due to wear and axial vibrations. As a result, the lever may become unseated from the clutch member thereby causing undesirable clutch operation such as an increase in histeresis. Furthermore, the clutch is subjected to rotational and centrifugal force which may shift the lever in a radial direction. A shift in the radial direction of the clutch by an amount as little as 0.5–2.0 millimeters may be significant enough to cause undesirable clutch operation by shifting the lever fulcrum to a new position. Shifting of the lever position during clutch operation is undesirable. Therefore, what is needed is a clutch lever locator to maintain a desired clutch position during normal clutch operation.

SUMMARY OF THE INVENTION AND ADVANTAGES

The present invention provides a clutch including a sleeve having a retainer movable along a rotational axis. A clutch member, such as an adjusting ring, is movable along the rotational axis. The clutch member includes a perch spaced from the rotational axis protruding from a surface on the clutch member. The perch includes first and second opposing outer walls with the second outer wall extending from the surface on an angle toward the first outer wall. A lever including a portion having a slot is supported on the perch by the slot. The slot includes first and second opposing inner walls proximate to the first and second outer walls, respectively, with the first inner wall forming an apex with a first face of the lever adjacent to the surface. The apex defines a lever fulcrum about which the lever pivots. A connector is secured to the clutch member with a portion of the second end portion arranged between the connector and the clutch member for retaining the second portion against the surface.

Accordingly, the above invention provides a clutch lever locator to maintain a desired clutch position during normal clutch operation.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 2:
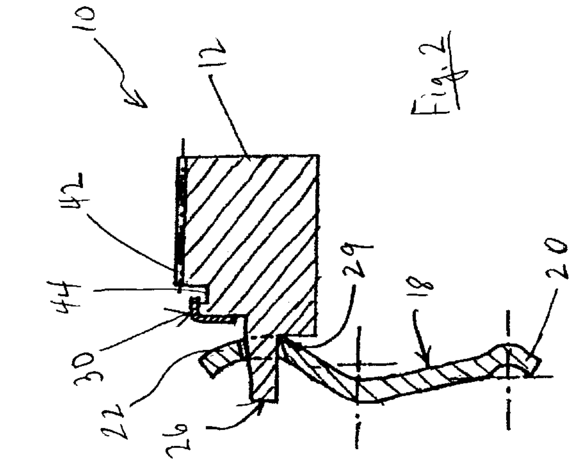
FIG. 2 is a cross-sectional view of the clutch taken along line 2—2 of FIG. 1.
Figure 4:
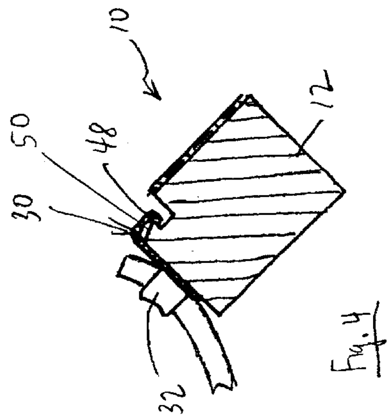
FIG. 4 is a cross-sectional view of the clutch taken along line 4—4 of FIG. 1.
Figure 1:
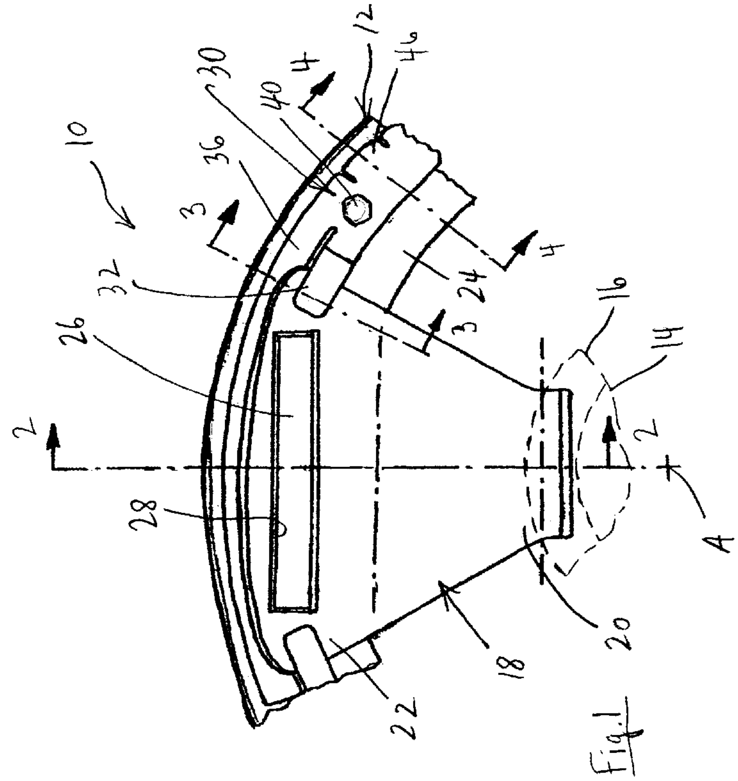
FIG. 1 is a partial view of a clutch depicting a lever supported on a rotating clutch member and a sleeve.

A partial view of a clutch 10 is shown in FIG. 1. As is well known in the art, the clutch 10 is arranged between an engine and a transmission. A clutch cover is typically fastened to a flywheel. A friction member is arranged within the clutch 10 and is coupled to the engine for receiving rotational drive from the engine. A sleeve is arranged about the shaft and is movable along the rotation of the axis in response to input from the clutch pedal.

The sleeve 14 includes a retainer 16 which has a groove. A lever 18, typically six, has a first end portion 20 received in the retainer 16. A second end portion 22 opposite the first end portion 20 is supported on a surface 24 of a rotating clutch member 12. The clutch member 12 may be an adjusting ring. As known in the art, an adjusting ring may cooperate with a pressure plate to provide adjustment of the clutch 10 as clutch components wear during normal clutch operation. However, it is to be understood that the clutch member 12 of the present invention may be a component other than the adjusting ring. That is, in some clutch embodiments the clutch member 12 may be the pressure plate. Movement of the sleeve 14 and the retainer 16 by the clutch pedal actuates the lever 18 to move the clutch member 12 into and out of engagement to engage and disengage the clutch 10, as is known in the art.

The surface 24 includes a perch 26 protruding therefrom. The lever 18 includes a rectangular slot 28 that is disposed about the perch 26 to locate the lever 18 relative to the clutch member 12. The second end portion 22 is curved in such a manner about the slot 28 to provide a fulcrum 29, which will be discussed in more detail below.

Prior art clutches have not utilized devices to locate and retain the levers relative to the clutch member. As a result, the levers have shifted undesirably in an axial and/or radial direction during normal clutch operation. To this end, the present invention incorporates a lever locator and geometry to minimize radial and axial shifting of the lever relative to the clutch member.

Figure 3:
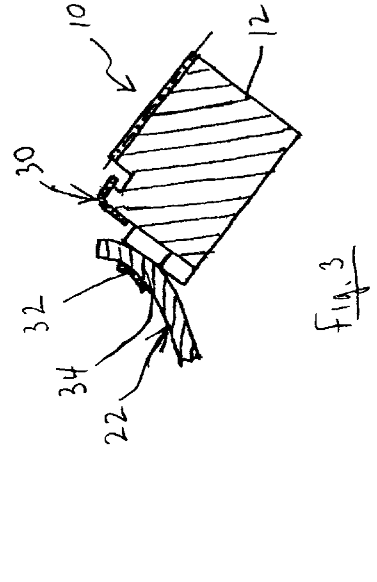
FIG. 3 is a cross-sectional view of the clutch taken along line 3—3 of FIG. 1.

The present invention clutch 10 includes a connector 30 that is arcuate in shape, and more preferably, annular in shape. Referring to FIGS. 1-4, the connector 30 includes spaced apart biasing members 32 formed by finger-like projections extending toward one another. The fingers 32 extend at an angle from a main portion 36 of the connector 30 and extend generally parallel to the main portion 36 toward one another. The portions of the fingers 32 that are generally parallel to the main portion 36 have a curved cross-section, as best seen in FIG. 3, that is complementary to the curvature of the second end portion 22 at the fulcrum area 29. Opposing portions 34 of the second end portion 22 are arranged between the finger 32 and the surface 24 of the clutch member 12. The second end portion 22 may be in direct contact with the surface 24. Fingers 32 provide sufficient force to retain the second end portion 22 of the lever 18 against the surface 24 to prevent axial shifting of the lever 18 relative to the clutch member 12 during normal clutch operation. However, the fingers 32 are curved in a complementary fashion relative to the curvature of the second portion 22 to permit uninhibited movement of the clutch lever 18 about its fulcrum 29 during engagement and disengagement of the clutch 10.

The connector 30 is secured to the clutch member 12 by a snap-fit relationship therewith and/or fasteners 40. The clutch member 12 has a circumferential surface 42 with a groove 44. A tapered surface 50 may extend from the surface 24 to the groove 44. The connector 30 may include a tab 46 extending from the main portion 36 in a direction of the circumferential surface 42. The tab 46 may include an L-shaped member 48 extending in a direction toward the rotational axis A. The tapered surface 50 guides the L-shaped member 48 into the groove 44 as the connector 30 is installed onto the clutch member 12. In this manner, the tab 46 and L-shape member 48 is retained in the groove 44 to secure the connector 30 to the clutch member 12.

The geometry of the perch 26 may be modified as compared to the prior art to minimize movement of lever 18 relative to the clutch member 12 in the radial direction. A preferred configuration of levers frequently used in clutches is referred to as a "knife-edge" configuration. For this configuration, the slot 28 is provided in the second portion 22 of the lever 18 at an angle to provide a point of contact with the clutch member 12 to provide a small fulcrum area and minimize the friction between the lever 18 and the clutch member 12. With this configuration there can be a large gap between the slot and the perch on the side opposite the fulcrum 29 which permits shifting of the lever relative to the clutch member in the radial direction. To this end, the present invention provides an improved geometry that minimizes the gap between the lever 18 and the clutch member 12 to minimize shifting of the lever 18 in the radial direction.

The perch 26 includes a first outer wall 54 that is generally perpendicular to the surface 24. The perch 26 also includes a second outer wall 56 spaced from the first outer wall and angled from the surface 24 toward the first outer wall 54. The perch 26 may include a portion 58 extending a distance beyond the lever 18, which may include a third outer wall 60 adjoining the second outer wall 56 in a direction generally parallel to the first outer wall 54.

The slot 28 is defined by a first inner wall 62 and a second inner wall 64 spaced apart from and parallel to the first inner wall 62. The lever 18 includes a first face 66 proximate to the surface 24 and a second face 68 opposite the first face 66. The first face 66 and first inner wall 62 intersect at an apex 70 that provides the lever fulcrum 29. During normal clutch operation the apex 70 is seated in a first corner 72 formed by the first outer wall and surface 24. The slot 28 is formed in the lever 18 at an angle such that a second corner 74 defined by the intersection of the first inner wall 62 and second face 68 is spaced from the first outer wall 54 to permit the lever 18 to pivot about the apex of fulcrum 70.

Figure 5:
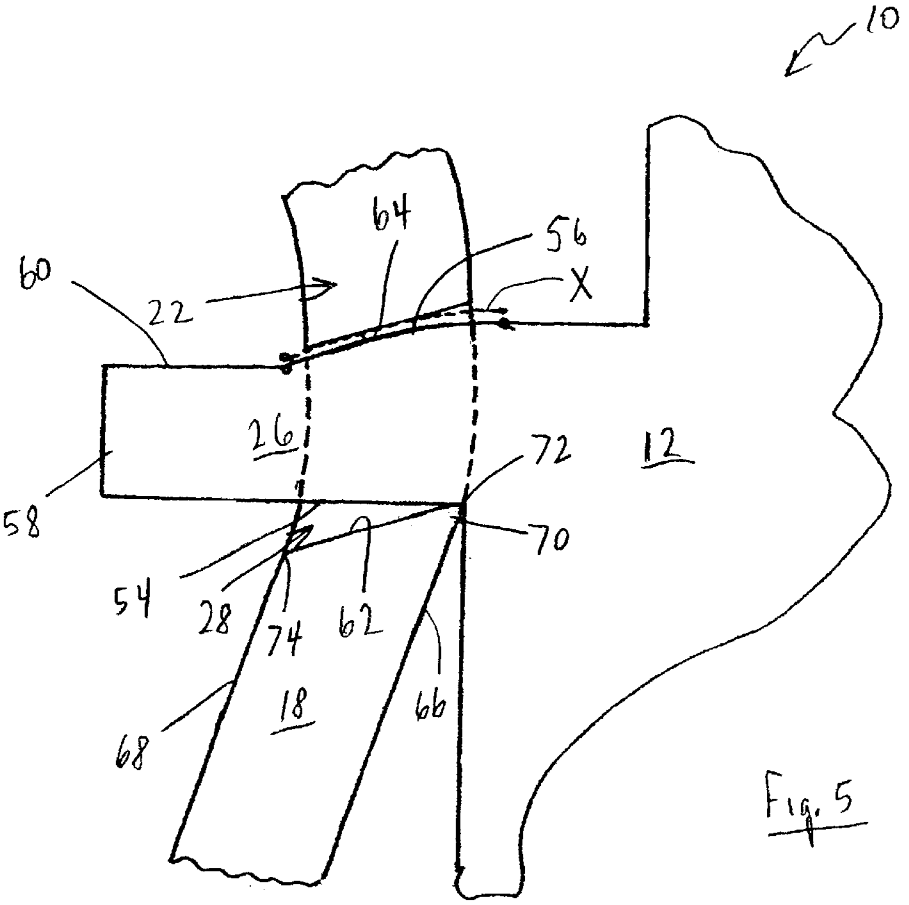
FIG. 5 is an enlarged view of the cross-section depicted in FIG. 2.
Figure 6:
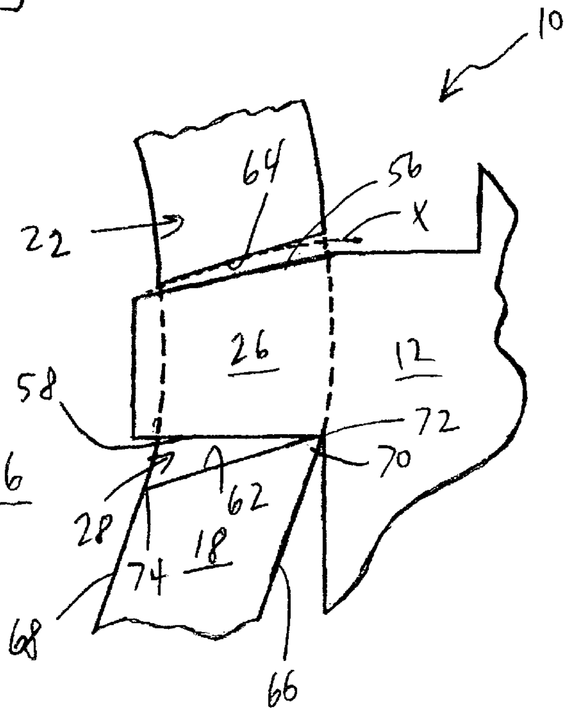
FIG. 6 is an alternative embodiment to the cross-sectional view depicted in FIG. 5.

The path of the second inner wall 64 as the lever 18 pivots about the apex 70 may be defined by a curve X. With the prior art, the second outer wall 56 extended from the third outer wall 60 in the same plane such that the second inner wall 64 was spaced from the second outer wall 56 near the surface 24. As a result, the lever 18 was permitted to shift radially relative to the clutch member 12. With the present invention, the second outer wall 56 is positioned more closely to the curve X to limit the relative movement between the lever 18 and the clutch member 12 during normal clutch operation. In FIG. 5, the second outer wall 56 is shown with a curved cross-section generally corresponding to the curve X. In an alternative embodiment shown in FIG. 6, the second outer wall 56 may be generally flat for simplicity. A generally flat angled second outer wall 56 still significantly limits the relative movement of the lever 18 relative to the clutch member 12 in the radial direction. Furthermore, the portion 58 shown in FIG. 5 may be eliminated to reduce the clearances needed within the clutch 10, as shown in FIG. 6.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A clutch comprising:

a sleeve;

a retainer movable along a rotational axis and connected to said sleeve;

a clutch member movable about said rotational axis;

a perch spaced from said rotational axis and protruding from a surface of said clutch member, a lever having a first end portion supported by said retainer and a second end portion located opposite said first end portion;

a slot located in said second end portion of said lever and structured for having said perch extend there through;

a connector secured to said clutch member, said lever being supported adjacent to said surface by said connector and by said perch, said connector structured so that a portion of said second end portion of said lever is disposed between said connector and said perch for retaining said second portion against said surface of said clutch member.

2. The clutch according to claim 1, wherein said clutch member is an adjusting ring.

3. The clutch according to claim 1, wherein said connector is secured to said clutch member with a plurality of fasteners.

4. The clutch according to claim 1, wherein said clutch member includes a circumferential surface extending axially from said surface, a groove located in said circumferential surface;

a tab located in said connector and received in said groove securing said connector to said clutch member.

5. The clutch according to claim 1, wherein said connector is generally arcuate in shape.

6. The clutch according to claim 5, wherein said connector is generally annular in shape.

7. The clutch according to claim 1, wherein said connector includes a biasing member with said portion of said second end portion disposed between said biasing member and said clutch member with said biasing member urging said portion into engagement with said surface.

8. The clutch according to claim 7, wherein said connector includes spaced apart biasing members engaging opposing sides of said lever, each of said opposing sides of said lever including a portion disposed between said biasing member and said clutch member.

9. The clutch according to claim 8, wherein said biasing members form fingers having a cross-sectional curved shape that is complementary to an adjoining curvature of said portion disposed between said biasing member and said clutch member.

10. The clutch according to claim 7, wherein the clutch member is finger shaped.

11. The clutch according to claim 1, wherein said perch includes first and second opposing outer walls with said second outer wall extending from said surface at an angle toward said first outer wall; and said slot includes first and second opposing inner walls proximate said first and second outer walls respectively with said first inner wall forming an apex with a face of said lever adjacent to said surface with said apex defining a lever fulcrum.

12. A clutch comprising:

a clutch member;

a perch protruding from a surface of said clutch member;

opposing first and second outer walls located on said perch with said second outer wall extending from said surface at an angle toward said first outer wall;

a lever;

a slot located in said lever and structured so that first and second opposing inner walls of said slot located proximate said first and second outer walls of said perch form respectively with said first inner wall an apex with a first face of said lever located adjacent to said surface with said apex defining a lever fulcrum;

and a connector structured so that a portion of a second end portion of said lever is disposed between said connector and said perch for retaining said second portion against said surface of said clutch member.

13. The clutch according to claim 12, wherein said surface and said first outer wall intersect at a first corner with said apex seated at said first corner.

14. The clutch according to claim 12, wherein said inner walls are generally parallel to one another.

15. The clutch according to claim 14, wherein said inner walls are generally flat.

16. The clutch according to claim 14, wherein said lever includes a second face opposite said first face with said second face and said first inner wall forming a corner spaced from said first outer wall in a clutch disengaged position.

17. The clutch according to claim 12, wherein said second outer wall includes a convex cross section.

18. The clutch according to claim 12, wherein said second outer wall includes a flat cross section.

19. The clutch according to claim 12, wherein a third outer wall portion adjoins said second outer wall portion extending away from said surface.

20. The clutch according to claim 12, wherein said first outer wall portion is generally perpendicular to said surface.

* * * * *